United States Patent [19]
Weaver

[11] 3,914,928
[45] Oct. 28, 1975

[54] VERSATILE HAY RAKE APPARATUS

[76] Inventor: Calvin P. Weaver, 226 W. Main St., Tipp City, Ohio 45371

[22] Filed: Oct. 10, 1974

[21] Appl. No.: 513,739

[52] U.S. Cl. ................................ 56/377; 56/15.6
[51] Int. Cl.² ........................................ A01D 77/06
[58] Field of Search ............ 56/377, 370, 365, 368, 56/14.9, 15.1, 15.3, 15.6

[56] References Cited
UNITED STATES PATENTS
2,436,475  2/1948  Jones et al. .......................... 56/377
FOREIGN PATENTS OR APPLICATIONS
1,058,993  2/1967  United Kingdom .................. 56/377

Primary Examiner—J. N. Eskovitz
Attorney, Agent, or Firm—Jacox & Meckstroth

[57] ABSTRACT

Hay rake apparatus of the side delivery type. The rake apparatus may be supported in front of a tractor by adjustable support means, such as by a boom or the like, for either left hand or right hand delivery. The rake apparatus may be attached at the rear of a tractor to be drawn behind the tractor, for either left hand or right hand delivery. In any position with respect to the tractor, the rake apparatus can be used for either raking or tedding of hay. The rake apparatus may be attached behind a truck, or automobile, or the like for rapid travel over roads, highways, and the like. The rake apparatus can be easily and readily changed from one type of operation to another type of operation.

20 Claims, 18 Drawing Figures

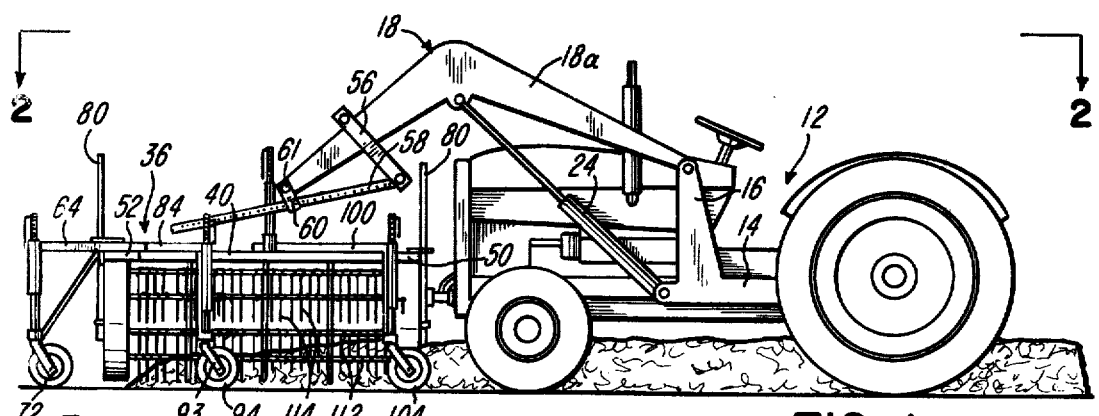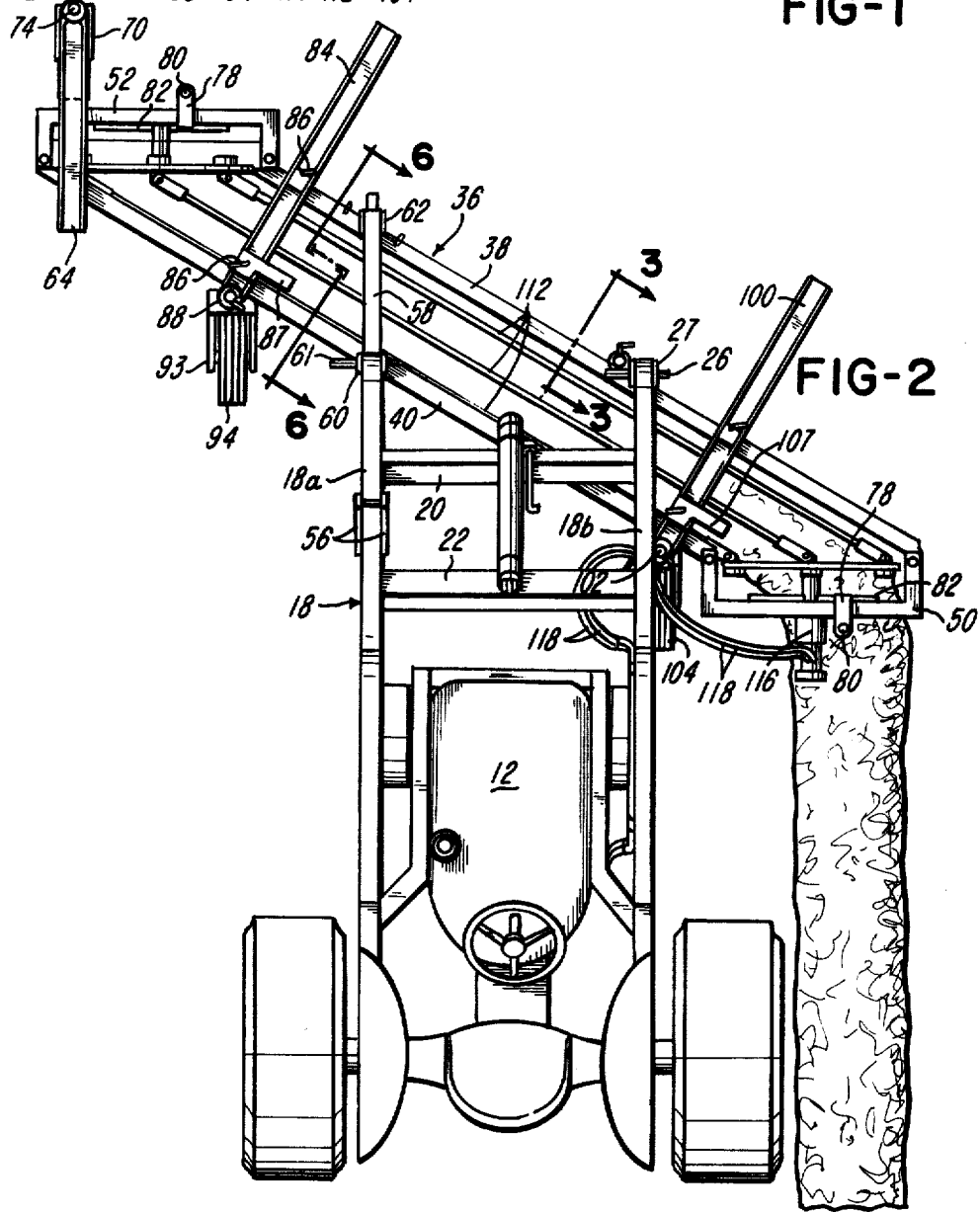

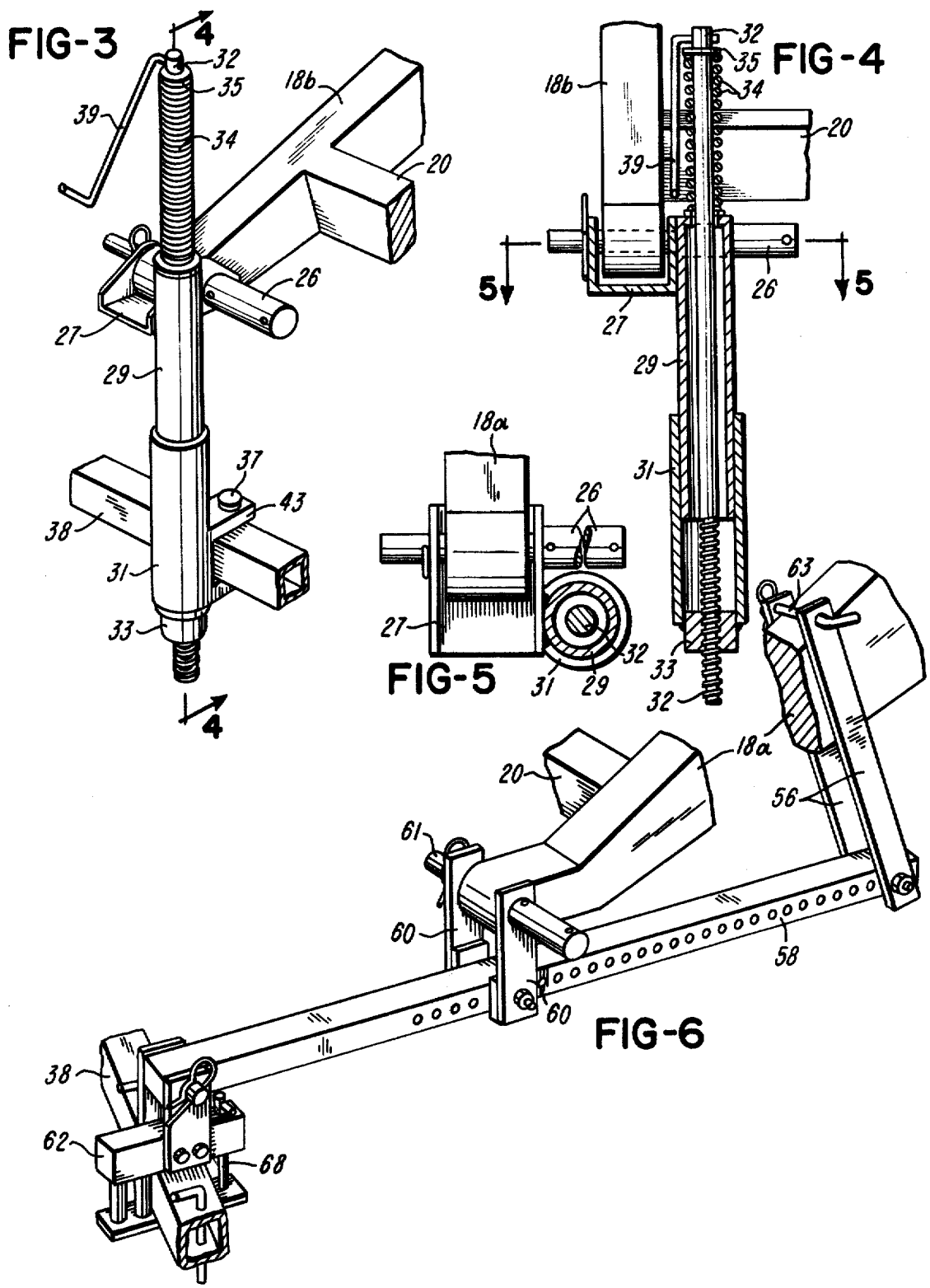

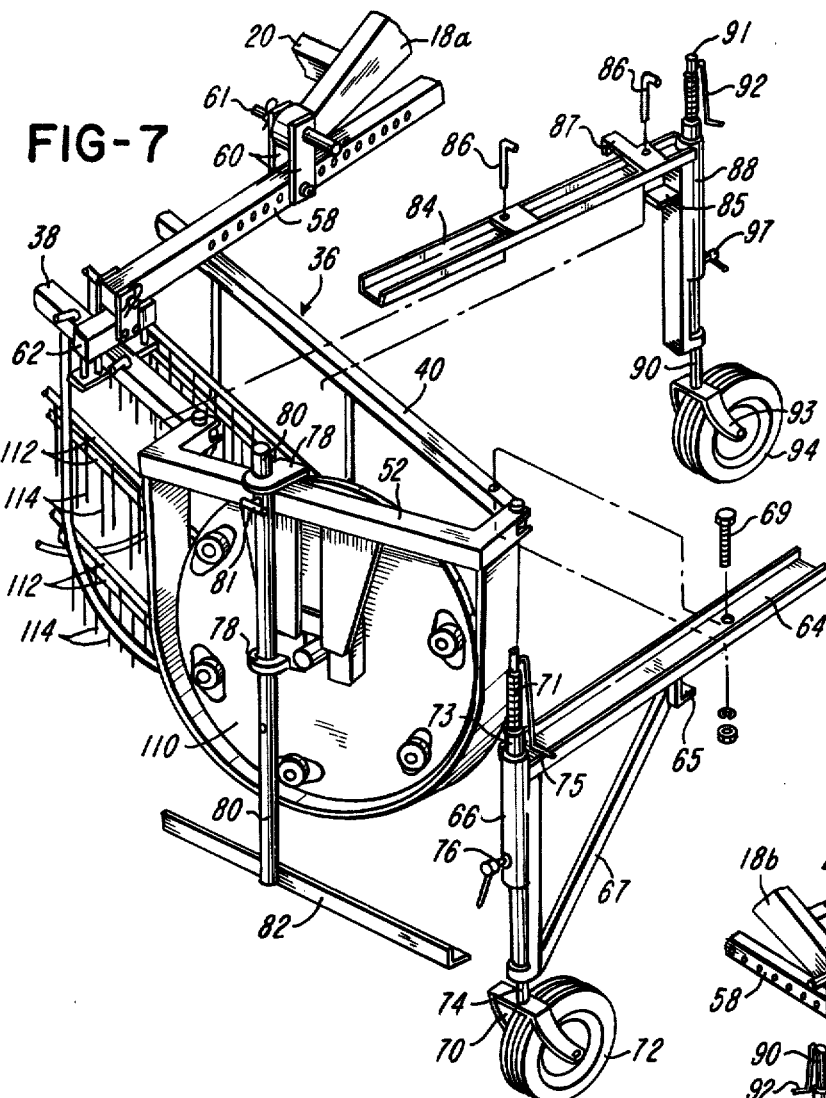
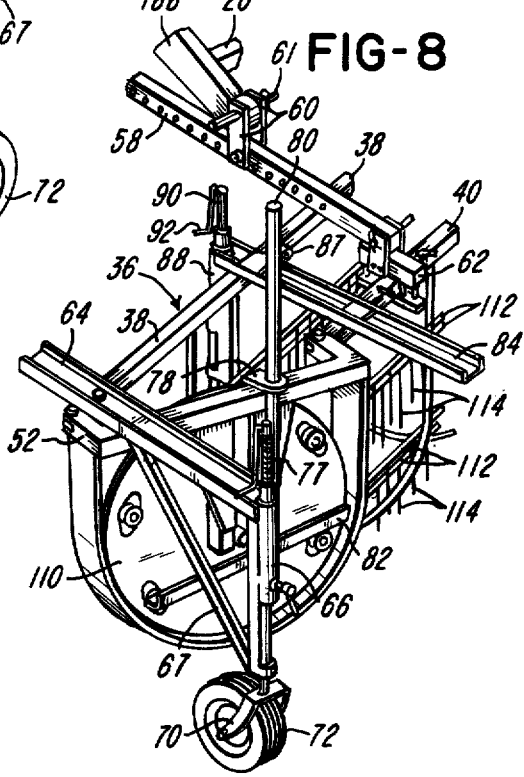

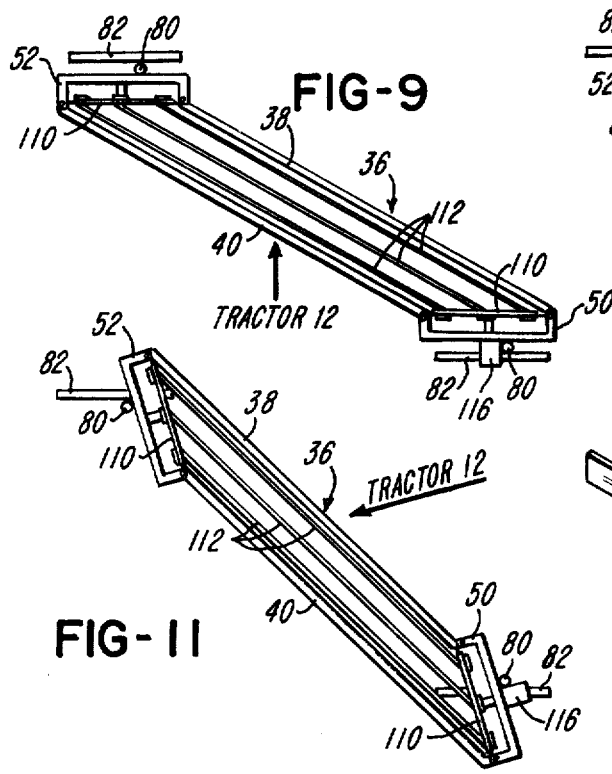
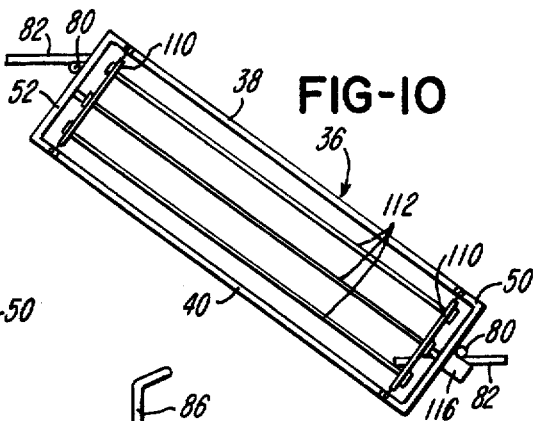
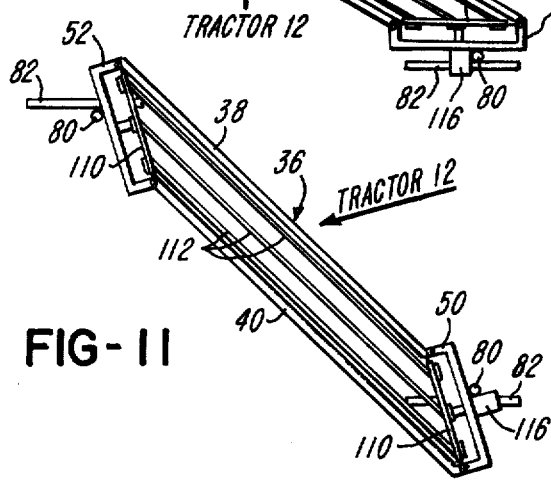
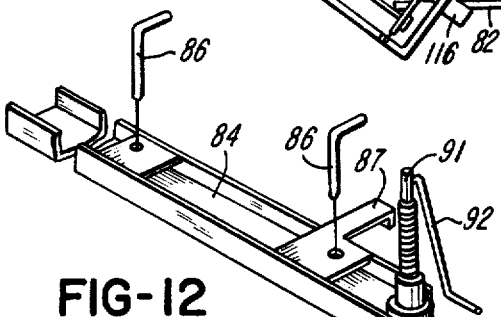
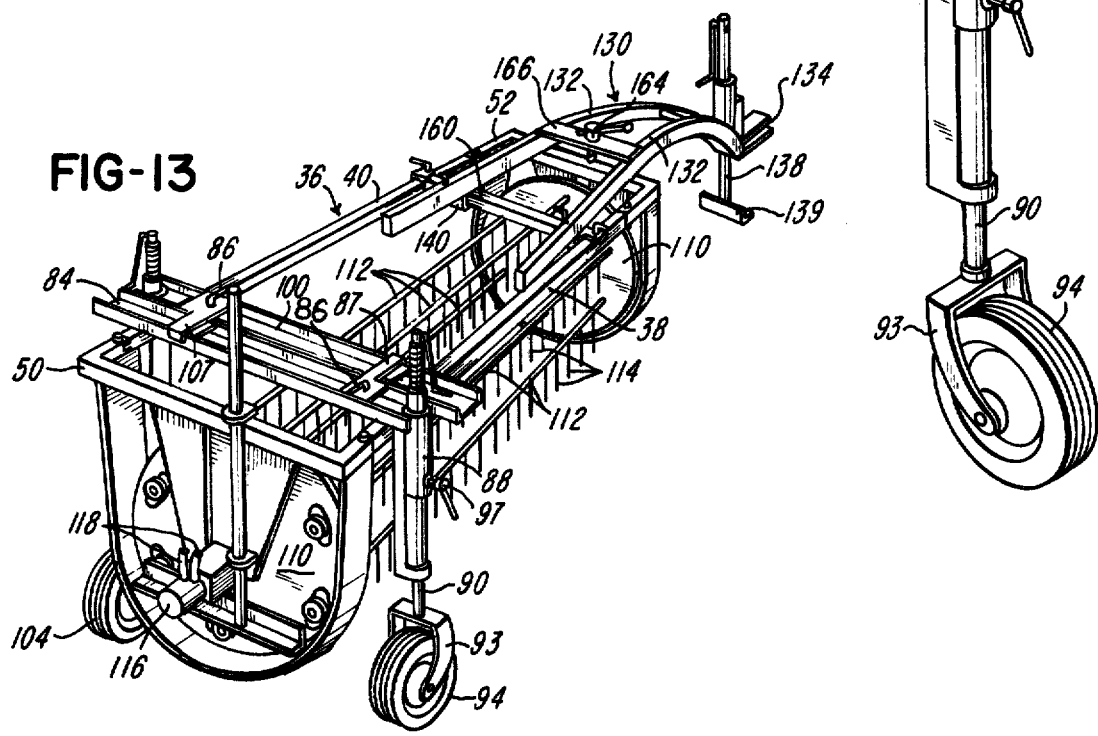

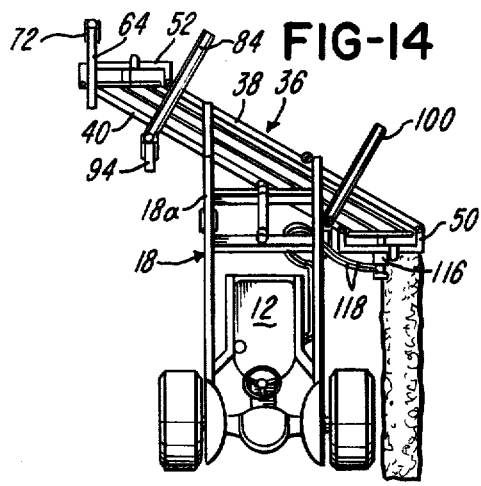
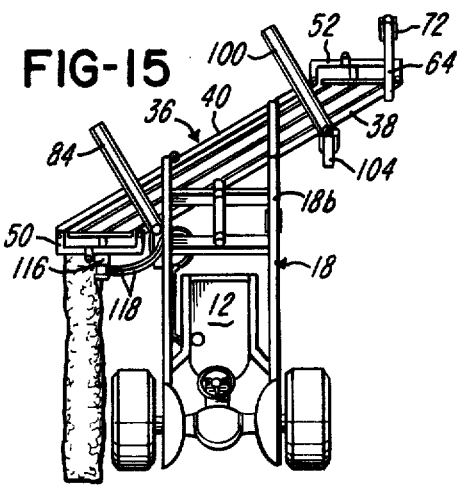
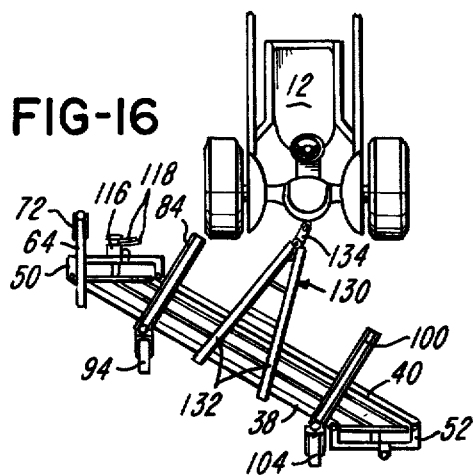
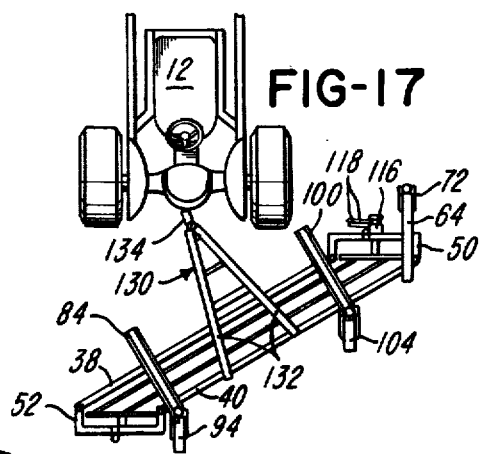
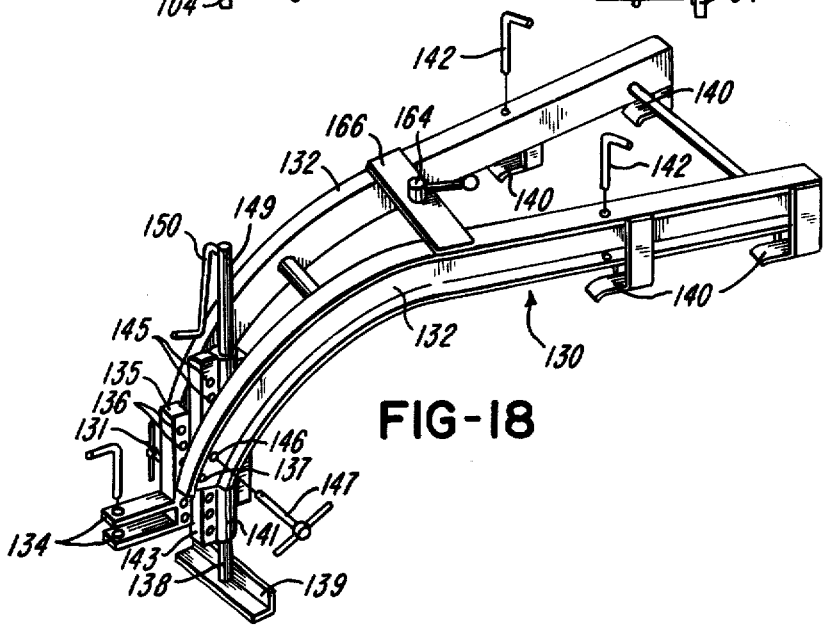

VERSATILE HAY RAKE APPARATUS

BACKGROUND OF THE INVENTION

This invention is an improvement over the apparatus disclosed in U.S. Pat. Nos. 2,847,814, 2,906,084 and 3,546,869, issued to the inventor herein.

SUMMARY OF THE INVENTION

Numerous types of raking apparatus have been devised. However, the versatility of all known hay rake apparatus is very limited.

U.S. Pat. Nos. 960,950 and 3,097,470 show rake apparatus which can be adjusted to extend laterally from either the right hand side or the left hand side of pulling means. However, each of the machines shown in these patents has the capability to rake only when the apparatus extends in one direction from the pulling means. For example, the apparatus of U.S. Pat. No. 3,097,470 is capable of raking operation only when the apparatus extends to the left of the tractor, and when the apparatus extends to the right of the tractor the apparatus is capable only of tedding. The same type of limitation exists in the apparatus of U.S. Pat. No. 960,950.

Furthermore, the apparatus of U.S. Pat. Nos. 960,950 and 3,097,470 are operable at only the rear portion of propulsion means.

Many other types of side delivery hay rake apparatus are known. However, it is believed that all such hay rake apparatus are strictly limited to raking delivery in one direction only.

It is an object of this invention to provide side delivery type hay rake apparatus which can be easily and readily attached to support structure at the front portion of a tractor or the like for push operation in either left hand or right hand delivery, or which can be attached to the rear of a tractor or the like for pull operation in either left hand or right hand delivery, or which can be attached to the rear of a truck, automobile, or the like, for pulling at relatively rapid rates on a road, highway or the like.

It is another object of this invention to provide apparatus which is capable of either raking or tedding of hay when the apparatus is positioned at either the forward portion of propulsion means or at the rear portion of propulsion means and when the apparatus extends from propulsion means from either the left hand portion thereof or from the right hand portion thereof.

Other objects and advantages of this invention reside in construction of parts, the combination thereof, the method of manufacture, and the mode of operation, as will become more apparent from the following description.

BRIEF DESCRIPTION OF THE DRAWINGS

FIG. 1 is a side elevational view of the hay rake of this invention attached to a tractor for support and operation of the hay rake in front of the tractor.

FIG. 2 is a top view, taken substantially on line 2—2 of FIG. 1.

FIG. 3 is an enlarged sectional view, taken substantially on line 3—3 of FIG. 2.

FIG. 4 is a sectional view, taken substantially on line 4—4 of FIG. 3.

FIG. 5 is a sectional view taken substantially on line 5—5 of FIG. 4.

FIG. 6 is an enlarged sectional view, taken substantially on line 6—6 of FIG. 2.

FIG. 7 is an enlarged fragmentary perspective view illustrating the relative positions of the support elements at a portion of the hay rake of this invention, as the hay rake is shown in FIGS. 1, 2, and 9.

FIG. 8 is a fragmentary perspective view illustrating support elements at another portion of the hay rake of this invention, as the hay rake is shown in FIG. 11.

FIG. 9 is a diagrammatic top plan view of the raking mechanism and the frame portion of a hay rake of this invention, illustrating these elements in a position of right hand delivery in push operation of the hay rake.

FIG. 10 is a diagrammatic top plan view, similar to FIG. 9, showing the raking mechanism and frame portions of the hay rake of this invention in an intermediate position during change from right hand delivery to left hand delivery.

FIG. 11 is a diagrammatic top plan view, similar to FIGS. 9 and 10, showing the raking mechanism and frame portions of the hay rake of this invention in a position of left hand delivery in push operation.

FIG. 12 is an enlarged fragmentary perspective view of a portion of the support structure and wheel structure of a hay rake of this invention.

FIG. 13 is a perspective view of a hay rake of this invention arranged for trailing behind a tow vehicle for travel.

FIG. 14 is a top plan view of a hay rake of this invention attached to and operated by a tractor in right hand delivery of the hay rake in push operation.

FIG. 15 is a top plan view, similar to FIG. 14, showing the hay rake of this invention in left hand delivery in push operation in front of a tractor.

FIG. 16 is a top plan view, similar to FIGS. 14 and 15, showing the hay rake of this invention in right hand delivery in pull operation behind a tractor.

FIG. 17 is a top plan view, similar to FIGS. 14, 15 and 16, showing the hay rake of this invention in left hand delivery in pull operation behind a tractor.

FIG. 18 is an enlarged perspective view showing tow structure of a hay rake of this invention.

DESCRIPTION OF THE PREFERRED EMBODIMENTS

Hay rake apparatus of this invention, as illustrated in FIGS. 1 and 2 can be supported and operated at the front end of a tractor 12, which has support structure 14 carried thereby. The support structure 14 is provided with pedestal members 16. A boom 18 is pivotally attached to the pedestal member 16 and is carried thereby. The boom 18 comprises parallel arm members 18a and 18b, there being one arm member at each side portion of the tractor 12.

A transverse member 20 and a transverse member 22 are positioned between the arm members 18a and 18b and are attached thereto.

A reciprocally operable fluid motor 24, shown in FIG. 1, is positioned at each side portion of the tractor 12 and is pivotally attached to one of the arm members 18a and 18b and is pivotally attached to the support structure 14, for raising and lowering the boom 18.

Hay rake apparatus 36 of this invention is provided with upper frame members 38 and 40, which are substantially parallel one with the other. One end of each of the frame members 38 and 40 is pivotally attached to a U-shaped end frame 50, and the other end of each of the frame members 38 and 40 is pivotally attached to a U-shaped end frame 52.

The boom 18 extends forwardly of the tractor 12. The hay rake apparatus 36 is attachable to the boom 18 for either left hand or right hand delivery. When attached for right hand delivery, as illustrated in FIGS. 1, 2, 3, 4, 5, 6, and 14, the forward end of the arm 18b of the boom 18 is pivotally attached by a pin 26 to a bracket 27. The bracket 27 is joined to a sleeve 29, as shown in FIGS. 3, 4, and 5. The sleeve 29 has the lower end thereof slidably positioned within a tube 31. The tube 31 has a nut 33 secured thereto at the lower end thereof. A rod 32 extends through the sleeve 29 and the tube 31. The rod 32 is threaded within the nut 33. Encompassing the upper part of the rod 32 is a coil spring 34 which is positioned between a disc 35, carried by the rod 32 and the upper end of the sleeve 29. The rod 32 is rotatable by means of a crank 39 attached to the upper end thereof. As best shown in FIG. 3, a bracket or clamp 43, secured to the tube 31 and a pin 37 attach the tube 31 to the frame member 38.

As shown in FIGS. 1 and 6, attached to the arm 18a of the boom 18 is a collar 56. An extension member 58 is pivotally attached to the collar 56 and extends forwardly and is pivotally attached to links 60 which are pivotally connected by a pin 61 to the arm 18a adjacent the end thereof. The extension member 58 extends forwardly of the arm 18a and is pivotally attached to a clamp 62 which is attached to the frame member 38, as best shown in FIG. 6. A quick release pin 63 attaches the collar 56 to the arm 18a, and a quick release pin 68 attaches the clamp 62 to the frame member 38.

As best shown in FIG. 7, attached to the frame member 40, adjacent the end frame 52, is an elongate connector member 64. The connector member 64 has a hook 65 which partially encompasses the end frame 52. A pin 69 is movable through the connector member 64 and the frame member 40 to retain the position of the hook 65 with respect to the frame member 40 and to maintain the position of the connector member 64 with respect to the end frame 52 and the frame member 40. The connector member 64 is integrally joined to a sleeve 66. A brace 67 extends from the sleeve 66 to the connector member 64. Within the sleeve 66 is a rod 74, which is axially and rotatively movable with respect thereto. At the lower end of the rod 74 is secured a yoke 70 which rotatively carries a wheel 72. Above the rod 74 and in axial alignment therewith and in engagement therewith is a threaded rod 71 which is threaded within a nut 73, which is secured to the upper end of the sleeve 66. A crank 75 is attached to the upper end of the rod 71 for rotation thereof and for adjustment of the spacing between the wheel 72 and the connector member 64. A stud 76 is threadedly attached to the sleeve 66 and extends therethrough and is engageable with the rod 74 to prevent rotative movement thereof with respect to the sleeve 66, to prevent caster or swivel movement of the wheel 72, when such caster operation is not desired.

Also, as best shown in FIG. 7, attached to the end frame member 52 by brackets 78, is a leg 80 which is vertically adjustable with respect to the end frame 52. The leg 80 has a base 82. A pin 81 is used to retain the leg 80 in adjusted upper or stowed position or in its lower or support position. A similar leg 80 with a base 82 is attached to the end frame member 50.

As best shown in FIGS. 2 and 7, between the extension 58 and the end frame 52 is a cross member or connector member 84, which is attached to the frame members 38 and 40 by means of a hook 85, carried by the cross member 84. The cross member 84 is positionable in engagement with the frame member 40. Pins 86 extend through the cross member 84 and the frame members 38 and 40 to retain the cross member 84 in position of attachment to the frame members 38 and 40. A clamp or hook 87 extends laterally from the cross member 84. The cross member 84 has attached thereto a sleeve 88 which has therewithin a rod 91 which is threadedly adjustable upwardly and downwardly within the sleeve 88 by a crank 92, which is attached to the upper end of the rod 91, in the manner discussed with respect to the rod 71. A rod 90 similar to the rod 74, extends upwardly into the sleeve 88 and has a yoke 93 secured thereto at the lower end thereof. A stud 97 extends through the sleeve 88 and is engageable with the rod 90 to prevent rotative movement thereof with respect to the sleeve 88. A wheel 94 is rotatably joined to the yoke 93.

As shown in FIG. 2, a cross member or connector member 100 is attached to the frame members 38 and 40 in a manner similar to that discussed above with respect to the cross member 84. The cross member 100 has a laterally extending clamp or hook 107. The cross member 100 has an axially movable rod 102, which has a wheel 104 at the lower end thereof and is similar to the rod 90 in structure and use.

As best shown in FIGS. 7 and 13, the end frame members 50 and 52 rotatively support carrier members 110, each of which rotatively and pivotally supports a plurality of raking bars 112. The raking bars extend between the carrier members 110. Each of the raking bars has attached thereto a plurality of raking teeth 114. As shown in FIG. 13, the end frame member 50 has attached thereto a rotary fluid motor 116 which is joined to the carrier member 110 for rotation thereof. Fluid lines or conduits 118 are joined to the fluid motor 116 and extend to a fluid pump or the like, not shown, carried by the tractor 12.

FIGS. 1 – 7 show the raking apparatus 36 of this invention and parts thereof positioned and connected for right hand delivery of hay as the raking apparatus 36 is pushed in front of the tractor 12.

With the raking apparatus 36 so positioned and connected, the boom 18 serves as support means and as means for pushing the raking apparatus 36. The wheels 72, 94, and 104 are adjusted with respect to the frame members 38 and 40 so that the raking teeth 114 are positioned at a desired height with respect to the ground over which the raking apparatus 36 travels. The rod 32 is threadedly rotatively movable to adjust the spacing between the boom 18 and the frame member 38. The spring 34, which is associated with the arm 18b and the frame member 38, permits resiliency in movement between the arm 18b and the frame member 38. The wheels 72, 94, and 104 are permitted to pivotally caster in their travel as necessary as the raking apparatus 36 travels over the ground.

The raking apparatus 36 can be easily and readily changed from right hand delivery to left hand delivery. The legs 80 are adjustably moved so that the bases 82 thereof engage the ground for support of the raking apparatus 36 by the legs 80. Then the cross members 84 and 100 are removed from the frame members 38 and 40, and the extension member 58 is detached from the frame member 38. The clamp 43 is removed from the frame member 38 and the bracket 27 is disconnected from the arm 18b. Under these conditions, the raking apparatus 36 appears substantially as shown in FIG. 9, supported by the legs 80.

Then the frame members 38 and 40 are pivotally moved with respect to the end frame members 50 and 52 to form substantially a rectangle, as illustrated in FIG. 10. Then the frame members 38 and 40 are moved to a further degree to the positions thereof illustrated in FIG. 11. Then the arm 18a of the boom 18 is attached to the frame member 40, in the manner discussed above with respect to the bracket 27, the sleeve 29, the tube 31, and the clamp 43. The extension member 58 is joined to the arm 18b in the manner discussed above with respect to the arm 18a. The position of the tractor 12 with respect to the raking apparatus 36 is illustrated in FIG. 11. The carrier member 110 with the fluid motor 116 is at the left portion of the tractor 12, as the fulid motor 116 is joined to the fluid conduit members 118 and to the fluid pump of the tractor. Thus, elements of the raking apparatus 36 appear substantially as shown in FIG. 8. For operation of the raking apparatus 36, the legs 80 are lifted from the ground to appear as shown in FIGS. 8 and 13.

Any suitable leverage means may be employed to adjust the angular position of the frame members 38 and 40 with respect to the end frame members 50 and 52, for changing the raking apparatus 36 from right hand delivery to left hand delivery, as illustrated in FIGS. 9, 10 and 11.

The raking apparatus 36 is also positionable behind a tractor for pull operation in either right hand delivery or left hand delivery, as illustrated in FIGS. 16 and 17. For such operation, tow structure 130, shown in detail in FIG. 18, is employed. The tow structure 130 includes a pair of arms 132, which converge at one end thereof and have a hitch 134 attached thereto. The hitch 134 is integral with a stem 135 which has a series of holes 136 therethrough. Any one of the holes 136 is alignable with holes 37 in the arms 132. A pin 131 is movable into the holes 137 and 136 to secure the adjusted position of the hitch 134 with respect to the arms 132.

A leg 138 having a base 139 is adjustably attached to the tow structure 130 adjacent the hitch 134. The leg 138 extends upwardly into a sleeve 141 which is integral with a stem 143. The stem 143 has a series of holes 145 therein, any one of which is alignable with holes 146 in the arms 132. A pin 147 is movable into the holes 145 and 146 to secure the adjusted position of the sleeve 141 with respect to the arms 132. Above the leg 138 in the sleeve 141 is a threaded rod 149 which is threadedly attached to the sleeve 141. A crank 150 is attached to the rod 149 for rotation thereof and to adjust the position of the leg 138 with respect to the sleeve 141.

On the lower surface of the arms 132 are hooks 140 which hook over the frame members 38 and 40. Pins 142 extend through the arms 132 and through one of the frame members 38 or 40 to secure the tow structure 130 to the frame members 38 and 40. The hitch 134 is connected to the rear portion of the tractor 12. The fluid motor 116, through the fluid conduits 118 is joined to the fluid pump of the tractor for operation of the raking apparatus. The cross members 84 and 100 extend across the frame members 38 and 40 and are attached thereto in the manner described above. In the position illustrated in FIGS. 16 and 17, the wheels 94 and 104 are prevented from caster or swivel operation by the studs 97. The connector member 64 with the wheel 72 is shown connected to the frame member 38, adjacent the end frame member 50 in FIG. 16, and is shown connected to the frame member 40, adjacent the end frame 50 in FIG. 17. However, under some conditions it may not be necessary to employ the use of the connector member 64 and its associated wheel 72.

The apparatus of this invention is capable of either raking of hay or tedding of hay in any one of the positions illustrated in FIGS. 14, 15, 16, and 17. In any given position shown in FIGS. 14–17, operation can be changed from raking to tedding, or vice versa, by changing the direction of rotation of the fluid motor 116. This may be accomplished by reversal of the fluid conduits 118 attached to the fluid motor 116, or by valving, or by any other suitable or convenient means.

The hay rake apparatus 36 is also arrangeable for trailing behind a truck or automobile on a road or highway or the like at relatively rapid rates of speed. As illustrated in FIG. 13, the cross members 84 and 100 are attached in adjacent substantially parallel relationship to the frame members 38 and 40, by means of the clamps 87 and 107, and the pins 86. The cross members 84 and 100 are positioned adjacent one end of the frame members 38 and 40. The tow structure 130 is attached to the frame members 38 and 40 adjacent the other end thereof. An auxiliary cross member 160 is attached to the frame members 38 and 40, and the hooks 140 of the tow structure 130 are joined to the cross member 160 adjacent the end frame member 52. A threaded stem 164 carried by a transverse member 166 of the tow structure 130 attaches the tow structure 130 to the end frame member 52. However, the tow structure 130 may be attached adjacent the end frame member 50, with the cross members 84 and 100 adjacent the end frame member 52.

When the tow structure 130 is not connected to a tow vehicle, the leg 138 may support part of the rake apparatus 36 to which the tow structure 130 is attached, as wheels 94 and 104 support the opposite portion of the raking apparatus 36. For tow operation the hitch 134 is connected to a trunk or automobile or the like and the leg 138 is raised to remove the base 139 from the ground and the raking apparatus 36 is ready to be towed at a relatively rapid rate over a road or highway or the like.

Thus, it is understood that the hay rake apparatus of this invention is attachable to any wheeled vehicle for movement thereby. The wheeled vehicle may be a tractor which also operates the hay rake apparatus, or the wheeled vehicle may be a truck or automobile or the like which only propels the hay rake apparatus.

Although the preferred embodiments of the rake apparatus have been described, it will be understood that within the purview of this invention various changes may be made in the form, details, proportion and arrangement of parts, the combination thereof, and mode of operation, which generally stated consist in apparatus capable of carrying out the objects set forth, as disclosed and defined in the appended claims.

The invention having thus been described, the following is claimed:

1. Rake apparatus comprising a pair of end frame members,
   a plurality of parallel elongate frame members pivotally joined to the end frame members,
   rotatable raking means supported by the end frame members,
   support means,
   wheel means, the wheel means being rotatably attached to the support means, the support means including means for quick release attachment of the support means to the frame members, quick release means for attaching the frame members to a propulsion vehicle for movement thereby.

2. Raking apparatus for attachment to a tractor having a boom provided with a pair of arms, comprising:
a pair of end frame members,
a plurality of elongate parallel frame members pivotally joined to the end frame members,
rotary raking means rotatably carried by the end frame members,
a plurality of cross members including quick release means for attachment thereof to the frame members and for removal therefrom,
wheel means rotatably attached to each of the cross members,
connector means for pivotally connecting either of the arms of the boom of the tractor to one of the frame members,
connector means for pivotally joining the other arm of the boom to one of the frame members.

3. The raking apparatus of claim 2 in which the connector means for pivotally joining said other arm of the boom to one of the frame members includes resilient means.

4. The raking apparatus of claim 2 in which the connector means for pivotally joining said other arm of the boom to one of the frame members includes a sleeve pivotally joined to said arm member, a tube encompassing a portion of the sleeve and axially movable with respect thereto, a nut secured to the sleeve, a rod extending through the sleeve and the tube, the rod being threadedly attached to the nut, the rod having a head, a spring member encompassing the rod and engaging the head and the sleeve and compressed therebetween, and means attaching the tube to the said frame member.

5. The raking apparatus of claim 2 in which the quick release means includes hook means attachable to the frame members and pin means movable through at least a portion of the frame members and the cross members.

6. Rake apparatus for attachment to a tractor for propulsion thereof and for operation thereof, comprising:
frame structure having end members and connecting members pivotally joined together,
rotary raking means carried by the frame structure,
connection means,
wheel means rotatably attached to the connection means,
quick release means for attaching the connection means to the frame structure and for removal therefrom.
means for pivotally attaching the frame structure to the forward portion of a tractor for propulsion thereby and for operation thereof for either right hand delivery or left hand delivery.

7. The rake apparatus of claim 6 which includes means for connecting the frame structure to the rear portion of a tractor for propulsion by the tractor and for operation by the tractor in either right hand delivery or in left hand delivery.

8. Rake apparatus for propulsion by a wheeled vehicle comprising:
a frame which includes a plurality of elongate frame members and a pair of end members pivotally attached thereto, the elongate frame members and the end members being pivotally arrangeable for right hand delivery, the elongate frame members and the end members being pivotally arrangeable for left hand delivery,
raking mechanism rotatably carried by the frame,
a plurality of connector members, wheel means rotatably attached to each of the connector members for support thereof, each of the connector members including means for quick release attachment thereof to the frame, each of the connector members being attachable to the frame at a plurality of portions thereof,
means for attaching the frame to a wheeled vehicle for propulsion thereby.

9. The rake apparatus of claim 8 in which the means for attaching the frame to a wheeled vehicle includes means for pivotally attaching the frame to a boom of a tractor.

10. The rake apparatus of claim 9 in which the means for attaching the frame to a portion of a boom of a tractor includes an extension member, means for attaching the extension member to the boom of the tractor, and means for pivotally attaching the extension member to the frame.

11. The rake apparatus of claim 10 which also includes means for pivotally attaching another portion of the boom to the frame.

12. The rake apparatus of claim 11 which includes means for adjustably and resiliently attaching said other portion of the boom to the frame.

13. The rake apparatus of claim 12 in which the means for adjustably and resiliently attaching said other portion of the boom to the frame includes a sleeve pivotally attached to said other portion of the boom, a tube attached to the frame, the sleeve being axially movable within the tube, a rod extending through the sleeve and the tube, the rod being threadedly adjustably attached to the sleeve, and resilient means biasing the tube toward the sleeve.

14. The rake apparatus of claim 8 in which the means for attaching the frame to a wheeled vehicle includes tow structure, means for attaching the tow structure to the frame, and means for pivotally attaching the tow structure to a wheeled vehicle.

15. The rake apparatus of claim 14 which includes means for attaching the tow structure to a plurality of the elongate frame members.

16. The rake apparatus of claim 8 in which one connector member is attached to an end member, and two of the connector members are attached to a plurality of the elongate frame members.

17. The rake apparatus of claim 14 which includes means for attaching the tow structure to the frame adjacent one of the end members so that the tow structure extends from the end of the frame, the rake apparatus also including means for attaching at least one connector member to the frame adjacent the other end member so that the wheel means supports at least a portion of the frame.

18. The rake apparatus of claim 14 which includes means for attaching the tow structure to the frame intermediate the end members so that the tow structure extends laterally from the frame members, the rake apparatus also including means for attaching a plurality of the connector members to the frame in spaced-apart relationship between the end members.

19. The rake apparatus of claim 14 in which the tow structure includes a plurality of laterally spaced elongate arms, one end portion of the arms being spaced apart, the other end portion of the arms being in adjacent relationship, a substantially vertical stem positioned between the portion of the arms which are in adjacent relationship, a hitch joined to the stem, the stem being adjustably attachable to said portion of the arms to adjust the position of the hitch with respect to the arms.

20. The rake apparatus of claim 19 which also includes a second substantially vertical stem positioned between the portion of the arms which are in adjacent relationship, a substantially vertical leg adjustably attached to the stem and movable upwardly and downwardly with respect thereto, the second stem being adjustably attachable to said portion of the arms to adjust the position of the leg with respect to the arms.

* * * * *